No. 780,343. PATENTED JAN. 17, 1905.
G. A. HUFF.
SNAP HOOK.
APPLICATION FILED OCT. 14, 1904.
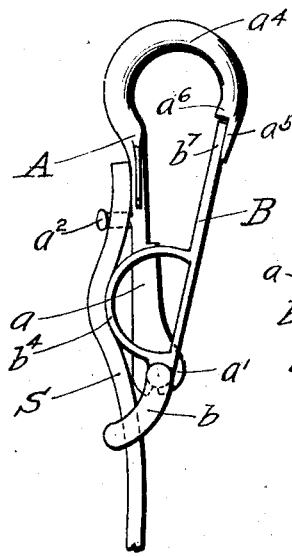
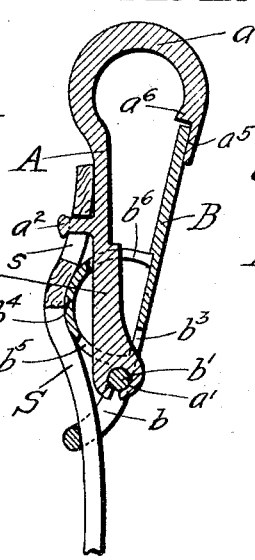
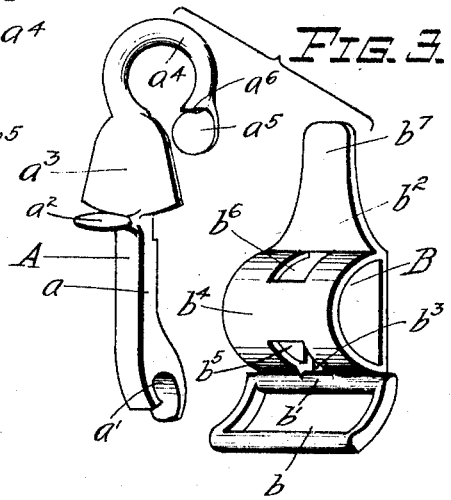
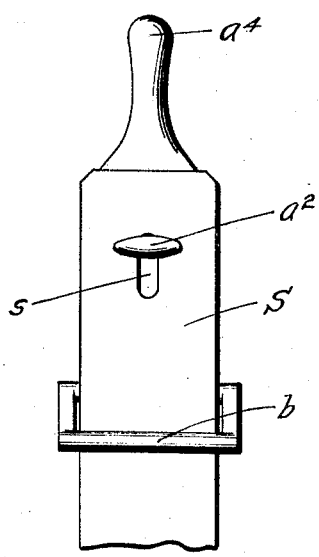
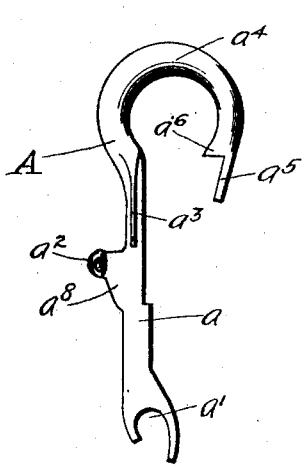
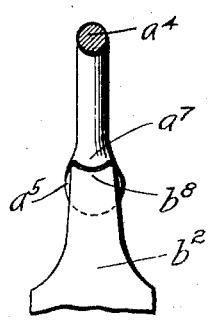
Witnesses
Inventor
George A. Huff
By Alexander T. Dowell
Attorneys No. 780,343. Patented January 17, 1905.

UNITED STATES PATENT OFFICE.

GEORGE A. HUFF, OF CHICAGO, ILLINOIS.

SNAP-HOOK.

SPECIFICATION forming part of Letters Patent No. 780,343, dated January 17, 1905.

Application filed October 14, 1904. Serial No. 228,446.

*To all whom it may concern:*

Be it known that I, GEORGE A. HUFF, of Chicago, in the county of Cook and State of Illinois, have invented certain new and useful Improvements in Snap-Hooks; and I hereby declare that the following is a full, clear, and exact description thereof, reference being had to the accompanying drawings, which form part of this specification.

This invention is an improvement in safety-hooks or snap-hooks for harness and other purposes in the arts where snap-hooks are useful; and its object is to produce a strong simple snap or self-closing hook without the use of springs for closing the tongue and which can be readily attached to and detached from a strap or halter without the need of knotting, sewing, or looping the strap, the hook being attachable somewhat like a buckle.

The invention consists in the novel construction of the hook and combination of parts therein, as hereinafter claimed, and the best form thereof now known to me is illustrated in the accompanying drawings, in which—

Figure 1 is a side view of one of my snap-hooks attached to a strap. Fig. 2 is a longitudinal central section thereof. Fig. 3 is a perspective view of the two members of the snap-hook detached, and Fig. 4 is a plan view thereof assembled. Figs. 5 and 6 are details of slight modifications of features of the hook.

The said snap-hook is constructed as follows, referring to the drawings by letters of reference marked thereon.

The snap-hook comprises a hook member A and a tongue member B. The hook member A has a shank portion $a$, substantially straight and having an eye $a'$ on its rear end adapted to engage a transverse bar $b'$ on the tongue member. The said eye $a'$ may be split and attached to the bar $b'$ by being closed therearound, as indicated in the drawings. This will enable the bar $b'$ to be formed integral with the tongue member. On the outer side of the shank and in advance of the eye $a'$ is a button-lug $a^2$, having a transversely-arranged T-head, with which the end of the strap S is engaged by means of an eyelet $s$ in the end of the strap, as shown. In advance of this button-lug the shank is flattened or widened laterally, as at $a^3$, to afford a good bearing for the end of the strap and a conveniently broad bearing-surface for the thumb or fingers when opening the hook. In advance of this flattened portion $a^3$ is the hook proper, $a^4$, which terminates in a flattened head $a^5$ approximately opposite the part $a^3$ and may have a small inwardly-projecting guard-lug $a^6$ on the inner side of this part $a^5$ to prevent anything engaged by the hook from slipping or wedging under that end of the tongue member which closes the hook.

The tongue member B, as shown, has a loop $b$ on its rear end, through which the strap S is passed. The inner bar $b'$ of this loop is engaged centrally by the shank of the hook member, as described, and from this inner bar $b'$ extends a flat tongue portion $b^2$ approximately as long as the shank between its eye $a'$ and the hook proper, $a^5$. This tongue portion $b^2$ is slotted at $b^3$ to accommodate the eye $a'$ of the hook member, and on this portion $b^2$ is a transverse bridge-piece or projection $b^4$, which may be semicircular in cross-section and is adapted to extend across and above the shank of the hook member between the eye $a'$ and button-lug $a^2$, said bridge-piece being slotted, as at $b^5 b^6$, to accommodate the shank of the hook member, said slots guiding the hook member in its swinging movement on the tongue member, (or vice versa.) An important function of this bridge-piece or its equivalent device, however, is to bow the strap S between the loop $b$ and the button-lug $a^2$, so that the strap will have a tendency to swing the hook member on the tongue member and cause the closing of the hook, and the more the strap is tautened the tighter will the hook close. The extremity $b^7$ of the tongue member is narrowed and projects into the hook $a^4$, terminating opposite the flattened end head $a^5$ thereof, against which it contacts, its extremity lying in front of the guard-lug $a^6$ when the hook is closed, as indicated in the drawings.

As indicated in detail, Fig. 6, the extremity of the tongue may be recessed or concaved, as at $b^8$, and the adjacent edge of the guard-lug convexed, as at $a^7$, to afford even greater protection against casual disengagement of the hook from an object by reason of the latter slipping between the hook and tongue and also to prevent relative lateral play of the tongue and guard-lug. As indicated in detail, Fig. 5, the button-lug $a^2$ may have a reinforcing-abutment $a^8$ on its rear side, so as to strengthen it and prevent its breaking under severe strains or pulls.

It will be observed that when the strap is pulled the riding thereof over the bridge-piece tends to draw the button-lug backward and outward, and thereby forcibly closes the tongue end against the hook-head. The natural resiliency of the short length of strap between the loop and button-lug bowed over the bridge-piece suffices to keep the hook closed even when the pull on strap is relaxed, so that my snap-hook does not require any spring-closer and is certain and reliable in operation.

Obviously the particular form of the bridge-piece and of other parts of the hook may be changed while retaining the essential features of the invention, and I therefore do not restrict myself to the precise form and construction of parts shown and described.

Having thus described my invention, what I claim, and desire to secure by Letters Patent thereon, is—

1. In a snap-hook, the combination of a tongue member provided with a strap-engaging device, and a strap-bowing device in advance of the strap-engaging device, and a hook member pivoted to the tongue member in rear of the strap-bowing device and provided with a strap-engaging device in advance of the strap-bowing device.

2. In a springless snap-hook, the combination of a tongue member provided with a strap-loop and bridge-piece; and a hook member pivoted to the tongue member in rear of the bridge-piece, and having a strap-engaging device in advance of the bridge-piece; with a strap passed through the strap-loop over the bridge-piece and connected to the strap-engaging device, substantially as described.

3. In a snap-hook, the combination of a tongue member having a strap-engaging device on one end and a strap-bowing device in advance of the strap-engaging device; with a hook member having a shank pivoted to the tongue member in rear of the strap-bowing device, a strap-engaging device in advance of the strap-bowing device, and a hook portion adapted to be closed by the free end of the tongue member.

4. In a snap-hook, the combination of a tongue member having a strap-engaging loop on one end and a bridge-piece in advance of the loop; with a hook member having a shank pivoted to the tongue member in rear of the bridge-piece, a button-lug on the shank in advance of the bridge-piece, and a hook portion adapted to be closed by the free end of the tongue member, substantially as described.

5. The herein-described snap-hook, consisting of the tongue member having a loop on one end for engaging the strap, a hook member having its shank pivoted or hinged to said tongue member in advance of the loop, a strap passed through the loop and connected to the hook member, and means interposed between the strap and the tongue member for bowing the strap at a point intermediate the loop and its connection to the hook member, substantially as described.

6. In a snap-hook, the combination of a tongue member having a strap-loop on one end and a bridge-piece in advance of the loop, and a hook member having its shank pivoted to the tongue member in rear of the bridge-piece, and having a hook on its forward end; with a strap passed through the loop and over the bridge-piece and connected with the hook member at a point in advance of the bridge-piece, substantially as described.

7. In a snap-hook, the combination of a tongue member having a strap-loop on one end and a bridge-piece in advance of the loop; and a hook member having its shank pivoted to the tongue member in rear of the bridge-piece, a button-lug in advance of the bridge-piece, and a hook on its forward end; with a strap passed through the loop and over the bridge-piece and connected with the button-lug, substantially as described.

8. The herein-described snap-hook, consisting of a tongue member having a loop on one end and a bridge-piece adjacent to the loop; with a hook member having a shank hinged to the inner bar of the loop, a button-lug on the shank, a flattened portion in advance of the button-lug, a hook proper bent back toward the tongue member, and a guard-lug at the end of the hook proper.

9. The herein-described springless snap-hook, consisting of a tongue member having a loop on one end, and a slotted bridge-piece adjacent to the loop; with a hook member having a shank passing through the slot in the bridge-piece and hinged to the inner bar of the loop, a button-lug on the shank in advance of the bridge-piece, a flattened portion in advance of the button-lug, a hook proper, bent back toward the tongue member having a flattened head, and a guard-lug at the end of the hook proper, substantially as described.

In testimony that I claim the foregoing as my own I affix my signature in presence of two witnesses.

GEORGE A. HUFF.

In presence of—
JAMES G. WOLCOTT,
JOSEPH J. SCHUSTER.